United States Patent
Reilly et al.

(10) Patent No.: US 9,825,939 B2
(45) Date of Patent: *Nov. 21, 2017

(54) IDENTITY FEDERATION AND TOKEN TRANSLATION MODULE FOR USE WITH A WEB APPLICATION

(71) Applicant: MASTERCARD INTERNATIONAL INCORPORATED, Purchase, NY (US)

(72) Inventors: Robert Reilly, Foristell, MO (US); Sandeep Chakravarthy Chimakurthi, Ballwin, MO (US); Bridget Huck, Wildwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/581,772

(22) Filed: Apr. 28, 2017

(65) Prior Publication Data

US 2017/0237730 A1    Aug. 17, 2017

Related U.S. Application Data

(63) Continuation of application No. 14/798,617, filed on Jul. 14, 2015, now Pat. No. 9,674,200.

(51) Int. Cl.
*H04L 29/06* (2006.01)

(52) U.S. Cl.
CPC ...... *H04L 63/0823* (2013.01); *H04L 63/0815* (2013.01); *H04L 63/0876* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 8,225,385 | B2 | 7/2012 | Chow et al. |
| 8,745,718 | B1 | 6/2014 | Dufel et al. |
| 9,130,921 | B2 | 9/2015 | Boubez et al. |
| 9,413,762 | B2 | 8/2016 | Durbha |
| 2007/0255841 | A1 | 11/2007 | Chong |
| 2008/0263652 | A1 | 10/2008 | McMurtry et al. |
| 2010/0043065 | A1 | 2/2010 | Bray et al. |

(Continued)

FOREIGN PATENT DOCUMENTS

| | | |
|---|---|---|
| JP | 2004-362189 | 12/2004 |
| JP | 2013-149238 | 8/2013 |
| JP | 2013-182302 | 9/2013 |

*Primary Examiner* — Izunna Okeke
*Assistant Examiner* — Hee Song
(74) *Attorney, Agent, or Firm* — Harness, Dickey & Pierce, P.L.C.

(57) ABSTRACT

An identity federation and security token translation module and method for operable engagement with a web application or an internet information service (IIS). A first server includes computer-executable instructions defining the identity federation and security token translation module for managing and facilitating a creation of a custom security principal object for a user requesting access to the web application. A data cache stores the custom security principal object in a non-transitory computer readable media. The identity federation and security token translation module may be changed without making changes to the web application or the IIS.

16 Claims, 4 Drawing Sheets

(56) References Cited

U.S. PATENT DOCUMENTS

| | | |
|---|---|---|
| 2010/0257578 A1 | 10/2010 | Shukla et al. |
| 2011/0131643 A1 | 6/2011 | Lawrence et al. |
| 2012/0084850 A1 | 4/2012 | Novak et al. |
| 2012/0331518 A1 | 12/2012 | Lee |
| 2013/0318569 A1 | 11/2013 | Canning et al. |
| 2014/0075188 A1 | 3/2014 | Yin et al. |
| 2015/0341391 A1 | 11/2015 | Menon et al. |

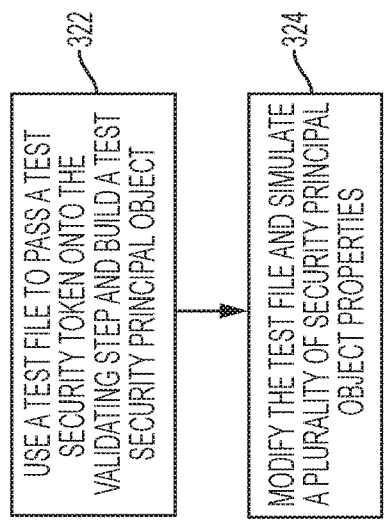
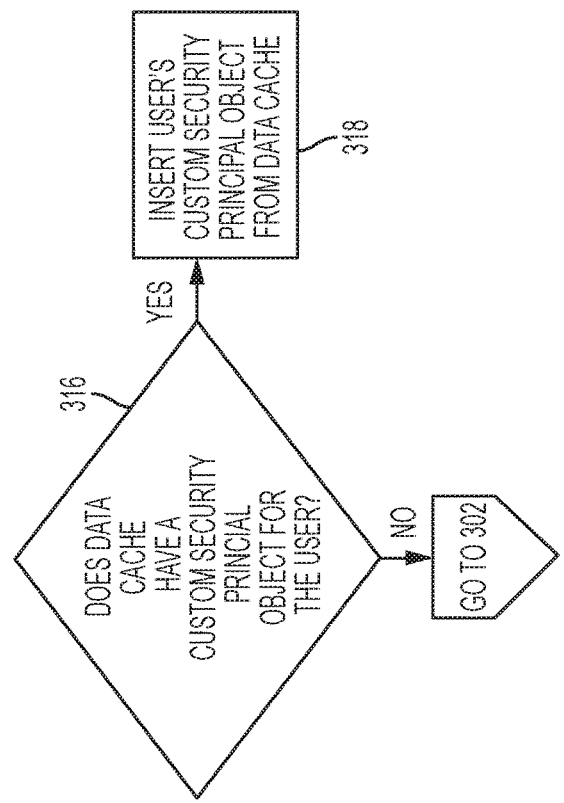

IDENTITY FEDERATION AND TOKEN TRANSLATION MODULE FOR USE WITH A WEB APPLICATION

CROSS-REFERENCE TO RELATED APPLICATION

This application is a continuation of U.S. patent application Ser. No. 14/798,617 filed Jul. 14, 2015. The entire disclosure of the above application is incorporated herein by reference.

FIELD

The present disclosure generally relates to an identity federation and security token translation module for operable engagement with a web application or an internet information service (IIS). More specifically, the module is for managing and facilitating a creation of a security principal object for a user requesting access to the web application.

BACKGROUND

This section provides background information related to the present disclosure which is not necessarily prior art.

Historically, identity federation has been accomplished using a web service proxy server and not directly from a web application. The web service proxy server used a variety of mechanisms to obtain detailed profile and fine grain access (FGA) information about a user of a web application. The variety of mechanisms included headers with a user's identification and web services or databases. This required web application developers to become familiar with and accommodate a variety of vendor specific security tokens, distracting the developers from the main purpose or business functions of the web application. FIG. 1 shows an example prior art system where an authentication proxy server 2, in an edge network provided by a content delivery service provider, receives access request from users of browsers 3 over communication paths 4. The authentication proxy server 2 then sends a user identification or a vendor specific token in an HTTP header to each appropriate application server 5 over communication path 6. This requires each application developer to provide each consuming web application with the proper security access code and procedures. The web applications also require someone to maintain a continuing knowledge of web security access changes and update each web application to accommodate such changes. The system of FIG. 1 also resulted in the HTTP header token becoming too large and difficult to handle.

DRAWINGS

The drawings described herein are for illustrative purposes only of selected embodiments and not all possible implementations, and are not intended to limit the scope of the present disclosure.

FIG. 4 is a possible additional logic flow that may be added to the logic flow of FIG. 3;

FIG. 5 is a further possible additional logic step that may be added to the logic flow of FIG. 3; and FIG. 6 is yet another possible additional logic flow that may be added to the logic flow of FIG. 3.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

A variety of security features are integrated into different applications, depending on, for example, the platform and/or environment in which the applications are to be deployed. Such security features often require developers of the applications to become familiar with the different available, and/or required security feature sufficient to integrated such features into applications. The modules described herein provide, in certain embodiments, a way to provide identity federation and security token translation directly from a web application, or an IIS. In this manner, the developer is relieved of the burden of knowledge of certain access security and further incorporating such security in the application. The application further may, rely on the integration of the module for security, whereby security changes may be made, via the module, without requiring any code changes to the web application or the IIS.

Figure 2:
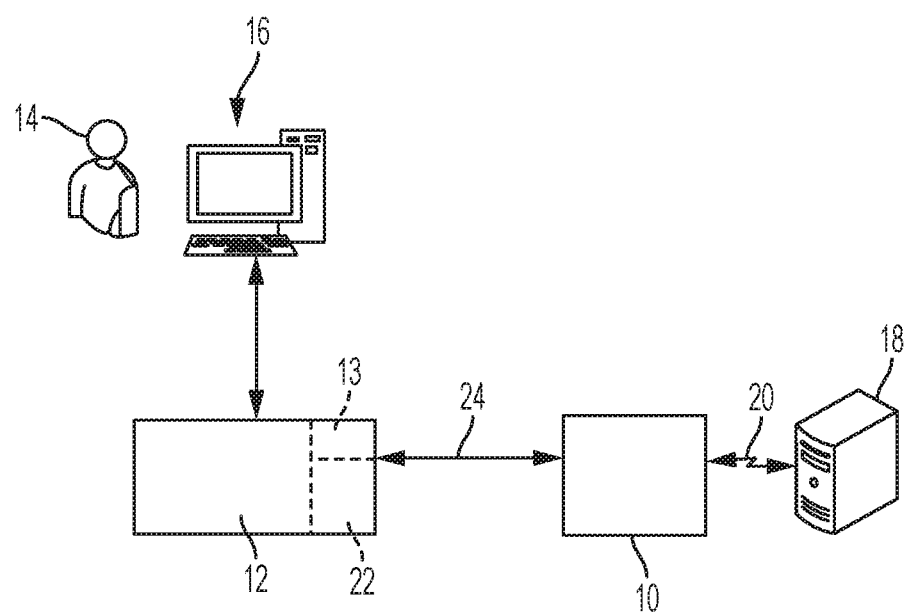
FIG. 2 is a diagram of a system including an example module.

FIG. 2 shows an example identity federation and security token translation module 10 for operable engagement with a server 12 containing a web application 13 and/or an internet information service (IIS). Server 12 may represent either the web application or the IIS server where the module 10 is plugged into the code of the web application or IIS. One of the advantages to the example module 10 is that it may be plugged in, removed, changed, updated, etc., without requiring any changes to the web application or IIS.

Server 12 is shown separate from module 10 to emphasize the independent modular structure of module 10. However, module 10 may reside in server 12 and be operably engaged with the web application or IIS. In this respect, server 12 may be described as a first server including computer-executable instructions defining the identity federation and security token translation module 10 for managing and facilitating a creation of a security principal object for a user 14 requesting access to the web application through a browser device 16, as shown. Browser device 16 may include any wired or wireless device that has connectivity to a network, including, without limitation, smart phones, tablets, laptop computers, or specialized devices designed for specific purposes such as, for example, automatic teller machines (ATMs) or kiosks.

The identity federation and security token translation module 10 may include the following components or threads. The module 10 may include an access thread for directly requesting and obtaining authentication and authorization tokens from at least one security token service (STS) 18, over communication path 20, based on a request for access from a user 14 of the web application 13. The module 10 may also include a new user security token request thread for requesting and receiving a security token from the STS 18. Further, the module 10 may include a secure sockets layer (SSL) certificate thread for pulling a SSL certificate from the web application 13 and sending the SSL certificate to the STS 18. Still further, the module 10 may include a validation thread for validating the received security token from the STS 18.

In an example, the user's access request may be routed through a junction in IBM's WebSEAL™ infrastructure where a security token cookie, (e.g., LTPAv2, etc.), is added to the request and passed back to the web application 13 and may form a part of the access thread. As is known, Web-SEAL™ is part of a single sign-on (SSO) solution that applies a fine-grained security policy in the internet space. A junction may be defined as a connection between two servers, e.g. a server containing WebSEAL™ and a server containing the web application 13. The connection may be an internet connection such as a TCP/IP connection or it may also be a connection within a single server or bank of servers if the WebSEAL™ product and the web application are located on the same server or bank of servers.

Each of the access thread, new user security token request thread, the SSL certificate thread, and the validation thread may be running concurrently or not at all. For example, as explained below, if the user has previously established access to the web application or IIS, the user's custom security principal object may be stored in a data cache and there will be no need for the new user security token request thread and the SSL certificate thread to run.

If the user is new, the new user security token request thread of module 10 requests the STS to provide, for example, a security assertion mark-up language (SAML) token. The module 10 may build a binary security token from the token cookie above. The module 10 may then make a request security token (RST) from the STS. The STS then validates that the user's request has a proper SSL certificate to make the request. The SSL certificate is the one pulled from the web application 13 by the module 10's SSL certificate thread. If the SSL certificate is proper, the STS validates the RST and the LTPAv2 token information. Next, the STS builds a SAML token for the user containing the user information and sends it to the module 10 where the validation thread validates the received SAML token.

Once the module 10 has validated the received security token (e.g., the SAML token), a user profile call thread of the module 10 may call the STS and receive the user's profile and fine grain access (FGA) information corresponding to the validated received security token. It is also noted that module 10 may further include a REST API to use the SAML token to look up additional properties about the authenticated user such as provided in an Independent Computing Architecture (ICA) protocol, for example as may be found in a Citrix® application. The combination of the SAML token from the STS and the further authentication and authorization information pulled from the REST API provides a more complete picture of the attributes of a user.

In this embodiment, a builder thread of module 10 is for building a custom security principal object from the received user profile and FGA information. For example, the STS response received by the user profile call thread may be parsed to create the custom security principal object. The module 10 may be a module that plugs into, for example, a Microsoft® .NET Framework.

If a .NET Framework is used, the module 10 may include an insertion thread for inserting the custom security principal object in the web application as an FGA dataset. In this example, the module 10 insertion thread replaces the ASP.NET HttpContext principal with the custom security principal object built by the builder thread.

As mentioned above, the module 10 may also include a data cache that stores the custom security principal object in a non-transitory computer readable media, wherein the data cache is located in the first server. The data cache may be of any appropriate size and may continue to hold a user's custom security principal object for a period of time appropriate to the web application's specification and requirements. The data cache may be located on the server 12, as shown at 22. The module 10 may also include a user cache search thread for determining if the data cache already includes a custom security principal object for the user requesting access to the web application. If the data cache includes a user's custom security principal object, this may be pulled from the data cache and inserted into the web application. The user's custom security principal object in the data cache may also be updated at this time.

One of the main benefits of the present example is that the identity federation and security token translation module 10 may be changed without making changes to the web application or the IIS. For example, the module 10 leverages the modular concept of the .NET Framework and allows the module to be removed, updated, changed, enhanced, and manipulated without requiring any changes to the code of the web application or the STS.

The module 10 may be formed as one or more dynamic link library (.dll) modules. The .dll modules may include an object model for providing the structure required by the module 10 and the web application to allow the custom principal object to be built and consumed. Another .dll module includes module 10 that interacts with a platform such as the example .NET Framework for translating tokens from web applications and a variety of STS providers.

The module 10 may form a part of a system where the at least one STS includes a second server (18 in this example) connected to the first server (12) over a network as shown in FIG. 2 at 20 and 24. In some examples, the data cache may be located on the second server.

In some examples, the web application may be on the first server, as shown. While in other examples (not shown), the web application may be on another server and connected to the first server over a connection such as, for example, an internet or other network connection.

Similarly, in some examples, the IIS may be on the first server, as shown. In other examples (not shown), the IIS may be on another server and connected to the first server over a connection such as an internet or other network connection.

In addition to the user profile call thread described above, the module 10 may include an additional calling thread for calling at least one other STS for obtaining additional information on the user using the validated received security token as an authentication to the at least one other STS.

The module 10 may provide an additional benefit to a web application developer or others by providing a developer testing thread for testing the identity federation and security token translation module on the first server without using a STS. The developer testing thread may be provided as a dynamic link library and allows the server on which the module 10 is located to simulate a networked STS. The developer testing thread may use an xml file as a test file for passing a test security token onto the validation thread for building a test security principal object. The developer testing thread may serialize a test principal object that is passed onto the ASP.NET application as would occur in a real-world scenario. The module 10 developer testing thread may be modifiable for simulating a plurality of security principal object properties, such as different FGA datasets.

The above example description of module 10 may remove the need for web application developers to know and incorporate complex network infrastructure and security mechanisms into their applications. The example module 10 may allow web application developers to focus on the application to build that supports their business plan. Web application developers may not need to be experts in networked security access protocols such as SAML, Windows Identity Federation, WS-Federation, etc. The module 10 allows configuration required components, such as SSL certificates and STS endpoints, to be managed and handled by a network infrastructure provider, as some of this information is not readily accessible to a web application developer and is more appropriate for network infrastructure personnel to manage.

Figure 1:
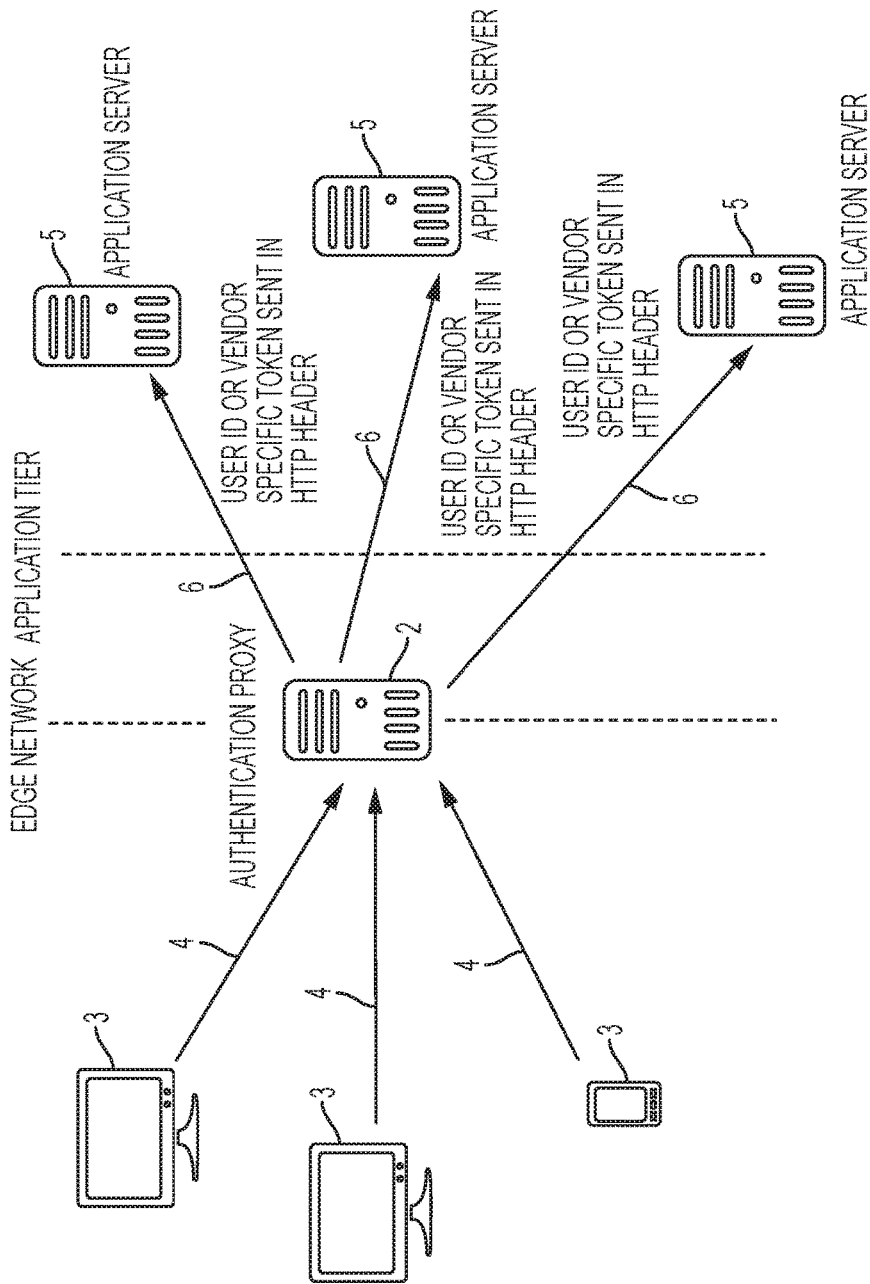
FIG. 1 is a diagram of a prior art system.

An example computer-implemented method 300 for providing identity federation and security token translation will now be described with reference to FIGS. 3-6. The method includes managing and facilitating a creation of a security principal object for a user requesting access to a web application by operably engaging with the web application and/or an internet information service (IIS), via a first server including computer-executable instructions defining a module, such as, for example, module 10. It should be appreciated, however, that the method illustrated in FIGS. 3-6 is not limited to the module of FIG. 1, and vice-versa, as the module and/or methods described herein may be different in other embodiments.

Figure 3:
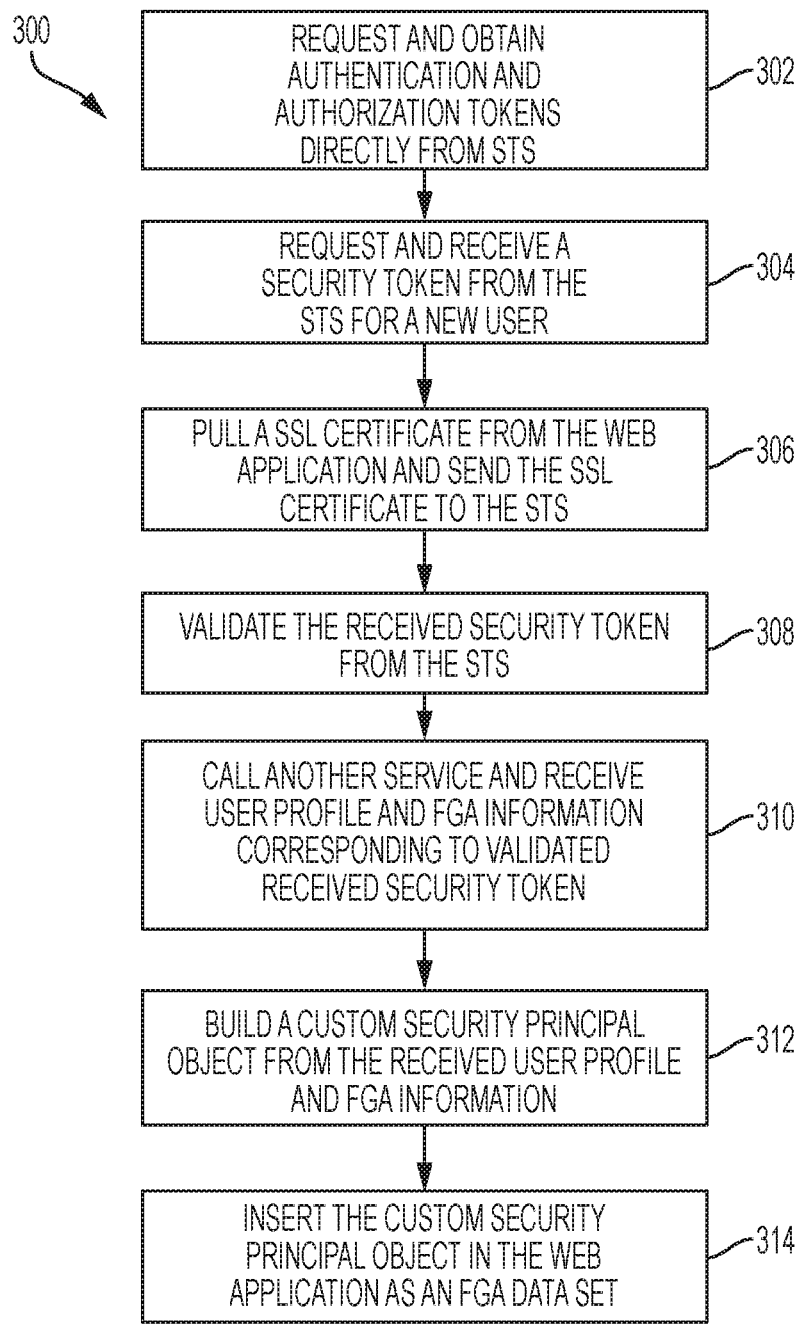
FIG. 3 is a logic flow for a portion of an example method.

The module 10, shown in FIG. 3, includes requesting and obtaining authentication and authorization tokens directly from at least one security token service (STS) based on a request for access from a user of the web application at 302. At 304, the module 10 requests and receives a security token from the STS for a new user. The module 10 further includes pulling a secure sockets layer (SSL) certificate from the web application and sending the SSL certificate to the STS, at 306.

In an example using the .NET Framework, steps 302-306 may include extracting a web proxy, vendor-specific token from http headers from the web application, creating a WS-Federation request security token using the vendor-specific token to build the binary security token mentioned above to authenticate the request of step 304. In addition, a web service SOAP channel may be secured using a mutually authenticated SSL certificate.

The STS then may send an error message if the request for a security token is not valid and this error message may be passed on to the user. Alternately, if the STS determines that the request at 304 was valid, the STS sends a SAML token to the module 10. The module, at 308 validates the received security token (in this example, the SAML token) from the STS. The module 10, at 310, includes calling another service, such as the ICA example above, and receiving user profile and fine grain access (FGA) information corresponding to the validated received security token (in this example, the SAML token). Therefore, in some examples, the STS may provide a basic SAML token containing only user identification and minimal basic profile information. The module 10 then uses the basic SAML token to call one or more other services to obtain more details on the user. This modular approach allows the HTTP header token to remain relatively small and easily transmitted and handled by applications. The module then could be updated and changed as needed without requiring any code changes to the web applications.

At 312, the module 10 further includes building a custom security principal object from the received user profile and FGA information. In this example, building the custom principal object includes converting (also referred to as translating) the SAML token properties and assertions into a custom .NET User Principal Object. At 314, the module 10 may further include inserting the custom security principal object in the web application as an FGA dataset.

In some examples, it may be advantageous that the method include storing the custom security principal object in a data cache including a non-transitory computer readable media, wherein the data cache is located in the first server. The storing step may be a part of module 10 and may be stored in a module session cache for re-use. Such storing of the custom security principal object in a data cache may save unnecessary and repetitive calls back to the STS.

It also may be advantageous to incorporate the method and module 10 using a .NET Framework so that the method includes changing the module 10 without making changes to the web application or the IIS. The example method accomplishes this by leveraging the modularity of the example .NET Framework and replaces the ASP.NET HttpContext principal with the custom security principal object. For example, the module 10 could be changed to obtain the FGA data from a representational state transfer application programming interface (REST API) instead of the SAML token used in the above example.

The example method may also include connecting the at least one STS located on a second server to the first server over a network. The example method may further include an example wherein the data cache is located on the second server.

In some examples, the web application may be on the first server and the IIS may also be on the first server or on another server connected over a network.

The example method and the module 10, immediately after receiving a request for access from a user, may further include, at 316 of FIG. 4, determining if the data cache includes a custom security principal object for the user requesting access to the web application. If the determination, at 316, is yes, the module 10 inserts the custom security principal object for the user from the data cache in the web application, at 318. If the determination at 316 is no, the method returns to 302. The steps 316 and 318 may be performed before step 302 to prevent redundant calls to the STS and unnecessarily building a duplicative custom security principal object for the user.

The example method may still further include calling at least one other STS and obtaining additional information on the user using the validated received security token as an authentication token to at least one other user profile service, as shown at 320 of FIG. 5. The additional information, including additional assertions, may be used within the example .NET Framework to support translating single sign-on attributes of, for example, IBM®'s webSEAL™ feature.

The example method may also provide web application developers a way to fully unit test their applications on a local workstation without the need for using a STS. The example method and/or module 10 may include a test including using a test file to pass a test security token onto the validating step and building a test security principal object, at 322 of FIG. 6. The method may further include modifying the test file and simulating a plurality of security principal object properties, at 324.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

It should be appreciated that the functions and/or steps and/or operations described herein, in some embodiments, may be described in computer executable instructions stored on a computer readable media (e.g., in a physical, tangible memory, etc.), and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the operations herein (e.g., in the claims, etc.), for example: (a) managing and facilitating a creation of a security principal object for a user requesting access to a web application by operably engaging with the web application or an internet information service (IIS), via a first server including computer-executable instructions defining a module; (b) requesting and obtaining, by the module, authentication and authorization tokens directly from at least one security token service (STS) based on a request for access from a user of the web application; (c) requesting and receiving, by the module, a security token from the STS for a new user; (d) pulling, by the module, a secure sockets layer (SSL) certificate from the web application and sending the SSL certificate to the STS; (e) validating, by the module, the received security token from the STS; (f) calling, by the module, another service and receiving user profile and fine grain access (FGA) information corresponding to the validated received security token; (g) building, by the module, a custom security principal object from the received user profile and FGA information; (h) inserting, by the module, the custom security principal object in the web application as an FGA dataset; (i) storing the custom security principal object in a data cache including a non-transitory computer readable media, wherein the data cache is located the first server; and (j) changing the module without making changes to the web application or the IIS.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A system for operable engagement with a web application or an internet information service (IIS) comprising:
    a first hardware server;
    wherein the first hardware server includes computer-executable instructions defining an identity federation and security token translation module for managing and facilitating a creation of a security principal object for a user requesting access to the web application;
    wherein the identity federation and security token translation module includes:
        an access thread for directly requesting and obtaining authentication and authorization tokens from at least one security token service (STS) based on a request for access from a user of the web application;
        a new user security token request thread for requesting and receiving a security token from the STS;
        a secure sockets layer (SSL) certificate thread for pulling a SSL certificate from the web application and sending the SSL certificate to the STS;
        a validation thread for validating the received security token from the STS;

a user profile call thread for calling another service and receiving user profile and fine grain access (FGA) information corresponding to the validated received security token;

a builder thread for building a custom security principal object from the received user profile and FGA information;

an insertion thread for inserting the custom security principal object in the web application as an FGA dataset;

a data cache for storing the custom security principal object in a non-transitory computer readable media, wherein the data cache is located on the first server; and wherein the identity federation and security token translation module is configured to be changed without necessarily making changes to the web application or the IIS.

2. The system of claim 1, wherein the at least one STS includes a second server connected to the first server over a network.

3. The system of claim 2, wherein the data cache is located on the second server.

4. The system of claim 1, wherein the web application is on the first server.

5. The system of claim 1, wherein the IIS is on the first server.

6. The system of claim 1, further including a developer testing thread for testing the identity federation and security token translation module on the first server without using a STS.

7. The system of claim 6, further including a test file for passing a test security token onto the validation thread for building a test security principal object.

8. The system of claim 7, wherein the test file is modifiable for simulating a plurality of security principal object properties.

9. A computer-implemented method for providing identity federation and security token translation comprising:

managing and facilitating a creation of a security principal object for a user requesting access to a web application by operably engaging with the web application or an internet information service (IIS), via a first server including computer-executable instructions defining a module;

requesting and obtaining, by the module, authentication and authorization tokens directly from at least one security token service (STS) based on a request for access from a user of the web application;

requesting and receiving, by the module, a security token from the STS for a new user;

pulling, by the module, a secure sockets layer (SSL) certificate from the web application and sending the SSL certificate to the STS;

validating, by the module, the received security token from the STS;

calling, by the module, another service and receiving user profile and fine grain access (FGA) information corresponding to the validated received security token;

building, by the module, a custom security principal object from the received user profile and FGA information;

inserting, by the module, the custom security principal object in the web application as an FGA dataset;

storing the custom security principal object in a data cache including a non-transitory computer readable media, wherein the data cache is located on the first server;

changing the module without making changes to the web application or the IIS.

10. The method of claim 9, further including connecting the at least one STS located on a second server to the first server over a network.

11. The method of claim 10, wherein the data cache is located on the second server.

12. The method of claim 11, wherein the web application is on the first server.

13. The method of claim 9, wherein the IIS is on the first server.

14. The method of claim 9, further including testing the module on the first server without using a STS.

15. The method of claim 14, further including using a test file to pass a test security token onto the validating step and building a test security principal object.

16. The method of claim 15, further including modifying the test file and simulating a plurality of security principal object properties.

* * * * *